July 7, 1964  W. G. STECH  3,140,424
POLARITY-REVERSING SYSTEM FOR ELECTRO-CHEMICAL PROCESS
Filed Jan. 16, 1962

INVENTOR.
WILLIAM G. STECH
BY
Osler & Ornstein
ATTORNEYS

United States Patent Office 3,140,424
Patented July 7, 1964

3,140,424
POLARITY-REVERSING SYSTEM FOR ELECTRO-
CHEMICAL PROCESS
William G. Stech, 3587 E. 49th St., Cleveland, Ohio
Filed Jan. 16, 1962, Ser. No. 166,536
1 Claim. (Cl. 317—8)

The present invention relates generally to the field of polarity-reversing devices and more particularly to a system for effecting polarity control and timing in electro-chemical processes, as for example, in electro-plating or electro-chemical descaling.

The concept of polarity-reversal of current flow is known in the electro-plating art and in like electro-chemical arts. However, the control apparatus heretofore developed and provided for such purpose is complex and costly in arrangement and does not provide the versatility or flexibility of control which is desirable for general plating facilities which encounter a wide variety of different plating problems.

It is the primary object of my invention to provide a control system for electro-chemical process which can be selectively adjusted to provide timed continuous current flow at one polarity or the opposite polarity, or to effect sequential reversals of electrical polarity in a predetermined or preselected timed relationship.

Another object of my invention is to provide a control device for a system of the character described which is compact and simple in arrangement and economical to manufacture.

Other objects and advantages of my invention will be apparent during the course of the following description.

In the accompanying drawings forming a part of this specification and in which like numerals are employed to designate like parts throughout the same, FIG. 1 is a schematic representation of an electrical control system in accordance with my invention.

Figure 1:
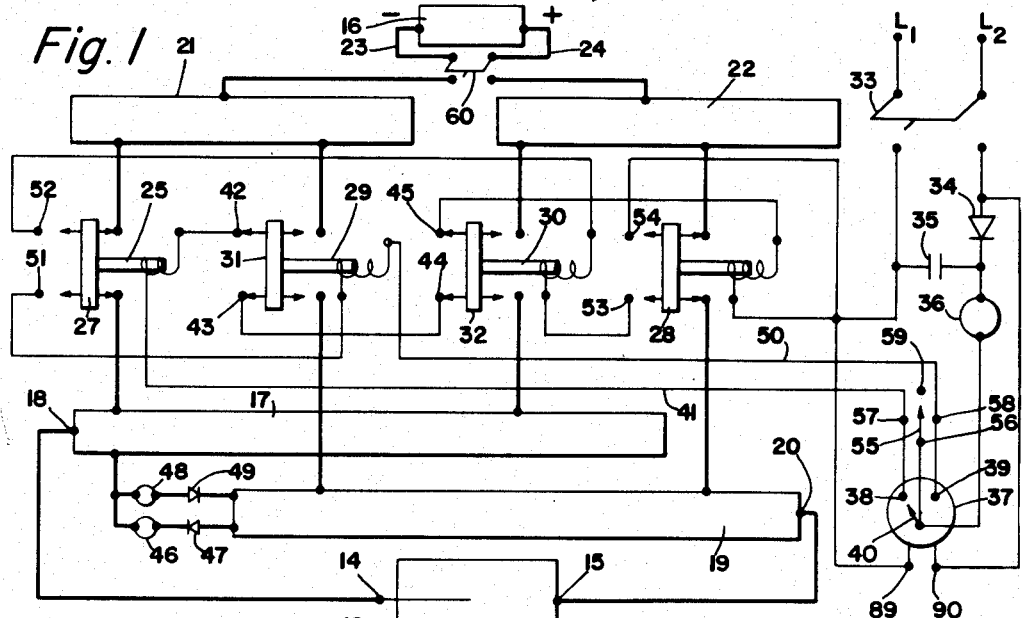
Figure 3:
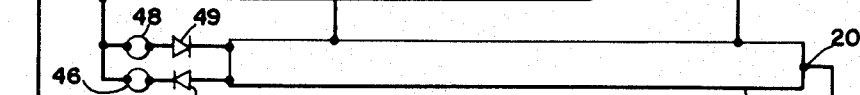
FIG. 3 is a view of a control unit embodying the control system of FIG. 1, portions thereof being removed to show details of the arrangement.

Referring more particularly to FIGS. 1 and 3 of the drawings, I have provided a housing 11 for a control device 10 in which are physically assembled and connected the various components which are diagrammatically shown in FIG. 1. The control device is shown as being utilized in an electro-plating operation in which a plating tank 13, having a normal cathodic terminal connection 14 and a normal anodic terminal connection 15, is adapted to be electrically connected to an electrical power source. The electrical power source for the plating current is here shown as a rectifier 16, but it will be understood that a motor-generator set or other forms of generating or conversion devices could be utilized instead.

It will also be understood that the control device and system is herein described in the environment of the electro-plating art for purposes of illustration and specific example, but that said device and system may be utilized in other analogous electro-chemical processes, such as descaling.

The normal cathode connection 14 on the tank is associated with a bus bar 17, as at 18, and, similarly, the anode connection 15 is associated with a bus bar 19, as at 20. Another set of bus bars 21 and 22 are connected to the negative and positive terminals, respectively, of the D.C. power source 16, as indicated at 23 and 24.

The control device 10 provides mechanism for electrically completing the process circuit to the plating tank 13, by electrically interconnecting either bus bars 17, 21 and 19, 22 or bus bars 17, 22 and 19, 21, if a change or reversal of electrical polarity at the tank connections 14 and 15 is desired. To this end, the control system includes a pair of electromagnetic switching relays 25 and 26, each of which is adapted to selectively actuate a double-pole, double-throw switch. The relay 25 operates switch 27 which, in one position, completes the process circuit between bus bars 17 and 21. The relay 26 operates switch 28 which, in one position completes the process circuit between bus bars 19 and 22. The diagram of FIG. 1 shows both switches 27 and 28 in said process circuit closing positions to complete the plating circuit to the tank 13.

A second pair of electro-magnetic relays 29 and 30 are provided to actuate a second set of double-pole, double-throw switches 31 and 32 respectively. When the relays 29 and 30 are actuated, the switches 31 and 32 are operated to a position in which the switch 31 completes the process circuit between bus bars 19 and 21, and the switch 32 completes the process circuit between bus bars 17 and 22, thus accomplishing a reversal of the electrical polarity at the tank 13. In FIG. 1 the switches 31 and 32 are shown in the open position.

Electrical power for the operation of the relays is provided from a conventional A.C. power source L, $L_2$ which may be 110 v., 60 cycle. A main switch 33 is provided for the power circuit. By providing a suitable silicon diode 34 in the power circuit and a suitable non-polarized condenser 35 across the lines L, $L_2$, a half-wave 48 volt D.C. energization current can be provided to the 24 volt D.C. actuating coils of the series-connected pairs of relays 25, 26 or 29, 30.

In operation of the device, the main switch 33 is closed to trigger or cock the control circuit. A mechanical time switch 36 in the circuit can be set to close the circuit for a selected time interval, for example, 1–120 minutes, and when this is done, the control circuit is completed. The current then passes to a synchronous timer 37 with adjustable cam cycle control for establishing the closing of alternative switch contacts 38 or 39 through movable contact member 40. The circuits alternately established through contacts 38 or 39 may be of equal or unequal time duration, in accordance with the selected cam setting on timer 37, and the equal cycle times may also be varied within limits. By way of example, the motor-driven timer 37 may be set so that each of the contacts 38 and 39 is engaged for 15 seconds.

When, for example, current flow is established through contact 38, the current flows through line 41; to the coil of relay 25; to contacts 42 and 43 which are bridged by the open position of switch 31; through contacts 44 and 45 which are bridged by the open position of switch 32; and through the coil of relay 26 to complete the circuit. It will be noted that the switches 31 and 32 are in series with the coils of relays 25 and 26 and that these switches must be in the non-actuated or open position in order that the coil-energizing circuit may be completed. If for any reason, either switch 31 or switch 32 has inadvertently not opened, the relays 25 and 26 will not be actuated.

When relays 25 and 26 are energized, the process circuit is completed through bus bars 17, 21 and 19, 22 to provide a negative polarity at the cathode connection 14 and a positive polarity at the anode connection 15. This is the normal cathodic cycle. A color signal light 46 in series with a silicon diode 47 and a signal light 48, of another color, in series with silicon diode 49 are disposed in electrical parallel to the bus bars 17 and 19. During the cathodic cycle, the signal light 46 will be lit, as diode 47 will permit current flow whereas diode 49 will not. When the polarity of the current is reversed, signal light 48 will glow, whereas diode 47 will prevent current flow to signal light 46. Thus, the respective lights 46 and 48 will indicate visually the direction and change of polarity in the process circuit.

When the timer 37 causes the control circuit to be directed through contact 39 rather than contact 38, a circuit is established by line 50 to the coil of relay 29; through contacts 51 and 52, which are bridged by the now open switch 27; through the coil of relay 30; and through contacts 53 and 54, which are closed by the now open switch 28, to complete the circuit. Again, a safety factor is provided in the series connection of the relay coils with the switch contacts 51–54, so that an electrical interlock is created which will prevent actuation of relays 29 and 30 if switch 27 or switch 28 is not in its non-energized or open position.

When relays 25 and 26 are de-energized and relays 29 and 30 are actuated, the switch 31 closes the process circuit between bus bars 19 and 21, and the switch 32 closes the process circuit between bus bars 17 and 22 to establish an anodic operating cycle in which a negative polarity is provided at the anode connection 15 and a positive polarity at the cathode connection 14. As above noted, this reversal of polarity will be indicated by the signal light 48.

In this manner, a pre-selected periodic reversal of the polarity of the process current is effected and will continue until the time period of operation as established by mechanical timer 36, has elapsed. At that point, the timer 36 opens the circuit.

A manual double-throw shunt switch 55 may be provided in electrical parallel with the contacts of the synchronous timer 37 so as to permit selection of a non-reversing current for the process circuit. The contact blade of switch 55 is connected electrically, as at 56 to contact element 40 or, if desired, directly to line $L_2$. One contact 57 of the switch 55 connects to line 41. The other contact 58 of the switch 55 connects to the line 50. The reference mark 59 denotes the neutral or inoperative position of the switch 55. When the switch is inoperative, as shown in FIG. 1, a periodic reversal of polarity will take place as heretofore described. However, when switch 55 is moved to the left (FIG. 1), it causes cycle timer 37 to be ineffective and establishes a control circuit through contact 57 and line 41 to actuate relays 25 and 26 as heretofore described. The process circuit established by the actuation of relays 25 and 26 is then maintained, without any automatic reversal, until timer 36 opens the control circuit.

Similarly, when switch 55 is moved to the right postion, it establishes the control circuit through contact 58 and line 50 and maintains a process circuit of opposite polarity through energization of the relays 29 and 30.

Whenever the switch 55 is operatively utilized in either position, one pair of relays 25, 26 or 29, 30 will not be actuated by the operation of the cycle timer 37, as the switch 55 will retain one pair of relays energized or closed thereby maintaining its corresponding switches in open position so that no circuit can be established through the other pair of relays.

A main switch 60 is preferably provided in the lines 23, 24 for on-off control of the D.C. circuit.

Figure 2:
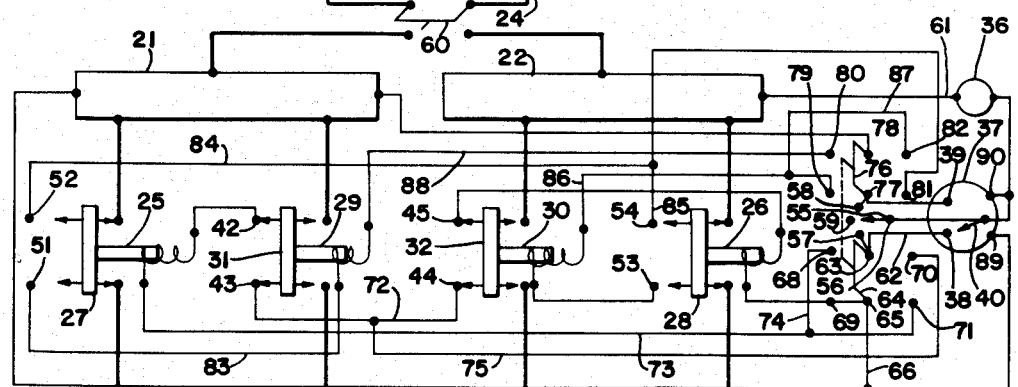
FIG. 2 is a representation similar to FIG. 1 but showing a modified form of circuitry in which the diodes have been eliminated from the circuit.

In FIG. 2, I have shown a modified form of my invention wherein the utilization of a separate A.C. power source for the control circuit is eliminated. Instead, the D.C. power source 16 for the plating circuit is also utilized for the control circuit. Heretofore, some attempts have been made to use the plating power source for the control circuit, but such arrangements were unsatisfactory because the relay control components were limited to use over a very narrow range of D.C. voltage, thereby limiting the voltage range which could be used for the plating process. Such an arrangement could only be used in production plating departments where the operating conditions were not changeable. However in contact plating shops where the voltage of the plating circuit has to be changed for each particular job, such an arrangement could not readily be used. Thus, for example, in contract plating shops where the plating circuit requires 4 volts for one plating job and 15 volts for another job, no single control system could utilize this broad range of plating voltage.

In the diagram of FIG. 2, I have shown a control system wherein means are provided for selectively using the control relays in series or in parallel, depending upon the plating voltage required. In this manner, the control system for polarity-reversal can be used over a broad range of plating voltages.

Referring more particularly to FIG. 2, I have again shown a D.C. power source 16 which through a main switch 60 is connected with bus bars 21 and 22. The bus bar 21 can be connected through actuation of relay 25 to bus bar 17 or, alternatively, through actuation of relay 29 to bus bar 19. The bus bar 22 can be connected through actuation of relay 26 to bus bar 19 or, alternatively through actuation of relay 30 to bus bar 17, as previously described. The double-pole, double-throw switches 27, 28, 31 and 32 function in the same manner as previously described by reference to FIG. 1, as does the timer 36, the cycle timer 37, and the manual cycle switch 55.

The control circuit is powered by the plating circuit source 16 and utilizes the voltage of the plating circuit. One side, for example, the positive side of the circuit, is connected through line 61 to the switch arm 40 of the cycle timer 37, whereby the current can be directed periodically to contact 38 or contact 39.

Assuming that the arm 40 is engaging contact 38, as indicated in FIG. 2, the current will go through line 62 to one pole 63 of a manual double-pole, double-throw switch 64, whose other pole 65 is connected through line 66 and line 67 to the negative side of the power source 16. One set of contacts 68, 69 of the switch 64 are adapted to establish a series circuit through the pair of control relays 25, 26. The other set of contacts 70, 71 of the switch 64 are adapted to establish a parallel circuit for the relays 25, 26. The pole 65 is permanently connected to contact 69. When switch 64 is thrown to engage contacts 68, 69, the current will flow from contact 69 through the coil of relay 26, through contact 45, switch arm 32 and contact 44, through line 72 to contact 43, through switch arm 31 and contact 42, through the coil of relay 25 and through line 73 and line 74 to contact 68 to complete the circuit.

If the manual switch 64 were thrown to engage contacts 70 and 71, the relays 25 and 26 would be connected in parallel and the current would flow from contact 71 through line 73 to the coil of relay 25, through contact 42, switch arm 31 and contact 43 to line 72, and through line 75 to contact 70 to complete the energizing circuit for relay 25. Current would flow from contact 71 through contact 69 to the coil of relay 26, through contact 45, switch arm 32, contact 44, line 72 and line 75 to contact 70 to complete the energizing circuit for relay 26.

A similar manual double-pole, double-throw switch 76 having poles 77, 78 and pairs of contacts 79, 80 and 81, 82 is provided to establish a series or a parallel circuit of energization for the relays 29, 30 when the contact 39 of the cycle timer 37 is energized. The polt 78 has permanent connection to the contact 80.

When the switch 76 is thrown to engage contacts 79 and 80, current flows from contact 80 through the coil of relay 29, through line 83, contact 51, switch arm 27, contact 52, lines 84 and 85, contact 54, switch arm 28 and contact 53 to the coil of relay 30, and through line 86 to contact 79 to complete the series circuit for relays 29 and 30.

When switch 76 is thrown to engage contacts 81, 82, current flows from contact 82 through line 87 and line 86 to the coil of relay 30, and through contact 53, switch arm 28, contact 54 and line 85 to contact 82 to complete the energizing circuit for relay 30. Current flows from contact 82 to contact 80 through line 88 to the coil of relay 29, and through line 83, contact 51, switch arm 27, contact 52, line 84 and line 85 to contact 81 to complete the parallel energizing circuit for relay 29.

The switches 64 and 76 are ganged so that both will be thrown simultaneously to like positions in which the pairs of relays will either be connected in series or in parallel, as desired. If the plating circuit is on the low voltage side, e.g., from 4-8 volts, the relays are switched to the parallel circuit arrangement. If the plating circuit is in the high voltage range, e.g., from 9-15 volts, the relays are switched to the series arrangement so that each relay will obtain half the plating voltage and thus will operate within substantially the same voltage range as in the low-voltage parallel circuit. Such relays could have a nominal rating of 6 volts for operation in this range. Thus, if the plating voltage has a value within 40% of the rated operating voltage of the relay coils, the relays are connected in parallel. At higher plating voltages, from 40% to 280% of the rated voltage, the relays are used in series.

Cyclic or selective polarity reversal of the plating circuit is achieved in the manner heretofore described. If periodic automatic polarity reversal is not desired, the manual switch 55 can be utilized as heretofore described. For this purpose, the switch contact 57 is permanently connected to the pole 63 of switch 64 and the switch contact 58 is permanently connected to the pole 77 of switch 76, so that selection of the series or parallel relay circuitry can be obtained even when switch 55 is being utilized.

It will be understood that the cycle timer 37 may be of the mechanical type or, as indicated in FIGS. 1 and 2 it may be electrically powered, as at terminals 89, 90. Details of the structure of the relays and timers have not been described as these are conventional components. The cam cycle timer may, for example, be Model C8301-S made by International Register Co. or model Series RA made by Industrial Timer Corporation. Similarly, the double-throw switch arms of the relays may be electrically energized to closed position in one direction and spring-loaded for positive contact in the non-energized position.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

In a polarity-reversing switch for an electro-plating D.C. electrical circuit, the combination of a first pair of double-pole, double-throw switches connected in series for completing said plating circuit at one polarity, a second pair of double-pole, double-throw switches connected in series for completing said plating circuit at an opposite polarity, electrically-energized actuating coils for said switches, a control circuit for energizing said coils, first selector switch means in said control circuit for selectively establishing said control circuit through the coils of either said first pair of switches or said second pair of switches, and second selector switch means in said control circuit for selectively connecting one coil of each of said pairs of switches in electrical parallel with the other coil of the said pair.

References Cited in the file of this patent
UNITED STATES PATENTS

| | | |
|---|---|---|
| 290,873 | Farmer | Dec. 25, 1883 |
| 508,069 | Whiting | Nov. 7, 1893 |
| 1,719,474 | Jutson | July 2, 1929 |
| 1,813,541 | Lauritsen | July 7, 1931 |
| 2,029,710 | Field | Feb. 4, 1936 |
| 2,037,565 | Dozler | Apr. 14, 1936 |
| 2,372,061 | Derr | Mar. 20, 1945 |
| 2,786,970 | Connoy | Mar. 26, 1957 |
| 2,922,929 | Cooper et al. | Jan. 26, 1960 |
| 2,964,682 | Jansen | Dec. 13, 1960 |